United States Patent [19]

Ward

[11] Patent Number: 5,067,857

[45] Date of Patent: Nov. 26, 1991

[54] APPARATUS FOR DIVERTING THE MOVEMENT OF CYLINDRICAL BODIES

[75] Inventor: Thomas J. Ward, Lakewood, Colo.

[73] Assignee: Coors Brewing Company, Golden, Colo.

[21] Appl. No.: 515,245

[22] Filed: Apr. 27, 1990

[51] Int. Cl.⁵ .............................................. B65G 51/18
[52] U.S. Cl. .................................. 406/181; 209/657; 209/941; 193/31 A; 198/360; 198/367
[58] Field of Search ................ 406/181, 88, 86, 1; 209/657, 656, 941, 924; 193/31 R, 31 A; 198/360, 367, 369

[56] References Cited

U.S. PATENT DOCUMENTS

| | | | |
|---|---|---|---|
| 431,699 | 7/1890 | Leake | 406/1 |
| 1,894,547 | 1/1933 | Tucker | 198/367 X |
| 2,037,931 | 4/1936 | Schmidt | 193/31 R |
| 3,028,959 | 4/1962 | Clark et al. | 209/924 X |
| 3,200,766 | 8/1965 | Gorjanc | 198/369 X |
| 3,411,829 | 11/1968 | Albright | 406/181 X |
| 4,369,005 | 1/1983 | Lenhart | 406/88 |
| 4,519,489 | 5/1985 | Dingus et al. | 193/31 R |
| 4,730,956 | 3/1988 | Lenhart | 406/86 X |

FOREIGN PATENT DOCUMENTS 2629805  10/1989  France .................................. 406/88

Primary Examiner—Margaret A. Focarino
Assistant Examiner—Gary C. Hoge
Attorney, Agent, or Firm—Klaas & Law

[57] ABSTRACT

Apparatus for changing the direction of movement of cylindrical bodies which are moving over a support surface in a first path by forming an opening in the support surface and mounting a diversion gate for reciprocal movement between first and second locations so that, when the diversion gate is at the first location, the cylindrical bodies will continue to move in the first path, but when the diversion gate is at the second location, the cylindrical bodies will be diverted from movement in a second path.

14 Claims, 3 Drawing Sheets

APPARATUS FOR DIVERTING THE MOVEMENT OF CYLINDRICAL BODIES

FIELD OF THE INVENTION

This invention relates generally to the movement of cylindrical bodies, such as empty can bodies having an open end and a closed end, from one location to other locations and more particularly to apparatus for diverting the movement of the cylindrical bodies from a generally horizontal path into another path.

BACKGROUND OF THE INVENTION

In a can body manufacturing facility, it is customary to move the empty can bodies from one location to other locations for different processing operations. One type of apparatus for moving the empty can bodies is an air track which comprises a top wall portion, opposite sidewall portions and an open bottom wall portion formed by spaced apart track means for supporting the can bodies. Air is directed through inclined openings in the top wall portion to move the empty can bodies over the track means from a first location to a second location. In some operations, it is desirable to interrupt the movement of the empty can bodies and divert them for movement to a third location instead of the second location. In order to do this, it is customary for production or maintenance personnel to remove a portion of the air track and install another guide track to replace it. The air track is normally about fifteen feet above the floor level and piping and other structures make access to the portion to be removed difficult. Also, it is necessary that the another guide track be properly aligned with the remaining portion of the air track to ensure jam free movement of the empty can bodies. In addition to the possible injuries by a fall or falling tools, there is considerable downtime every time it is desired to divert the empty can bodies. Thus, there existed a need for a safe and efficient method and apparatus for diverting the direction of movement of the empty can bodies.

BRIEF DESCRIPTION OF THE INVENTION

This invention provides for the diversion of cylindrical bodies, such as empty can bodies having an open end and a closed end, moving in a generally horizontal path from a first processing operation to a second processing operation, to another path leading to a third processing operation using reciprocally mounted apparatus for movement between a first location wherein a generally horizontal support section permits the continued movement of the cylindrical bodies in the generally horizontal path and a second location wherein an arcuate guide section diverts the cylindrical bodies for movement in another path to the third processing operation.

In a preferred embodiment, the apparatus of this invention is used with an air track of the type described above. A portion of the spaced apart track means forming the bottom wall portion is cut away so that there is no bottom wall portion in that portion of the air track. The apparatus of this invention comprises a diversion gate which is mounted for reciprocal movement in generally vertical directions between a first location and a second location. The diversion gate, when in the first location, has a generally horizontal support section which is moved through the cut away portion and provides a continuation of the spaced apart track means so that the cylindrical bodies can continue to move in the generally horizontal path. The diversion gate, when in the second location, has an arcuate guide section for contacting the cylindrical bodies and diverting them out of the generally horizontal path and into another path. The generally horizontal support section comprises a pair of generally horizontal, spaced apart rods, and the arcuate guide section comprises a first pair of arcuate, spaced apart rods and a second pair of arcuate, spaced apart rods located a distance from the first pair of arcuate, spaced apart rods to form an arcuate passageway for guided movement of the cylindrical bodies therethrough and wherein the arcuate passageway has an entrance portion and an exit portion. A pair of opposite sidewalls are secured to the sidewall portions of the air track at the cut away portion and cooperate with the first and second pairs of arcuate, spaced apart rods for guiding the movement of the cylindrical bodies through the arcuate passageway. A pair of spaced apart, linearly extending recesses are formed in the top wall portion of the air track opposite to the cut away portion. The recesses have a depth sufficient to receive all of the pair of generally horizontal, spaced apart rods and the entrance portion of the first pair of arcuate, spaced apart rods when the diversion gate is in the second location.

Moving means are provided for moving the diversion gate between the first and second locations. A support member is fixedly mounted at spaced apart locations on the sidewall portions of the air track. Support means for supporting the diversion gate are mounted on the support member for reciprocal movement. A pair of spaced apart shafts fixedly mounted on the support member, and a pair of spaced apart bushings fixedly mounted on the support means and the spaced apart bushings are mounted on the spaced apart shafts for reciprocal movement thereover. Holding means are provided for holding the generally horizontal, spaced apart support rods and the first and second pairs of arcuate, spaced apart rods in a fixed relationship. Portions of the holding means are secured to the support means for movement therewith. An air cylinder is mounted on the support member and is connected to the support means to provide the reciprocal movement to the support means. A first stop member is mounted at a fixed location on the support member and a second stop member is mounted at a fixed location on the support means and the first and second stop members cooperate to limit the movement of the support means in the vertical direction. Additional guide track means are mounted on the support member and cooperate with continuing portions of the opposite sidewalls for receiving cylindrical bodies from the exit portion of the arcuate passageway and guiding the cylindrical bodies to further guide means for guiding the cylindrical bodies to the third location.

BRIEF DESCRIPTION OF THE DRAWINGS

An illustrative and presently preferred embodiment of the invention is shown in the accompanying drawings in which.

DETAILED DESCRIPTION OF THE INVENTION

Figure 2:
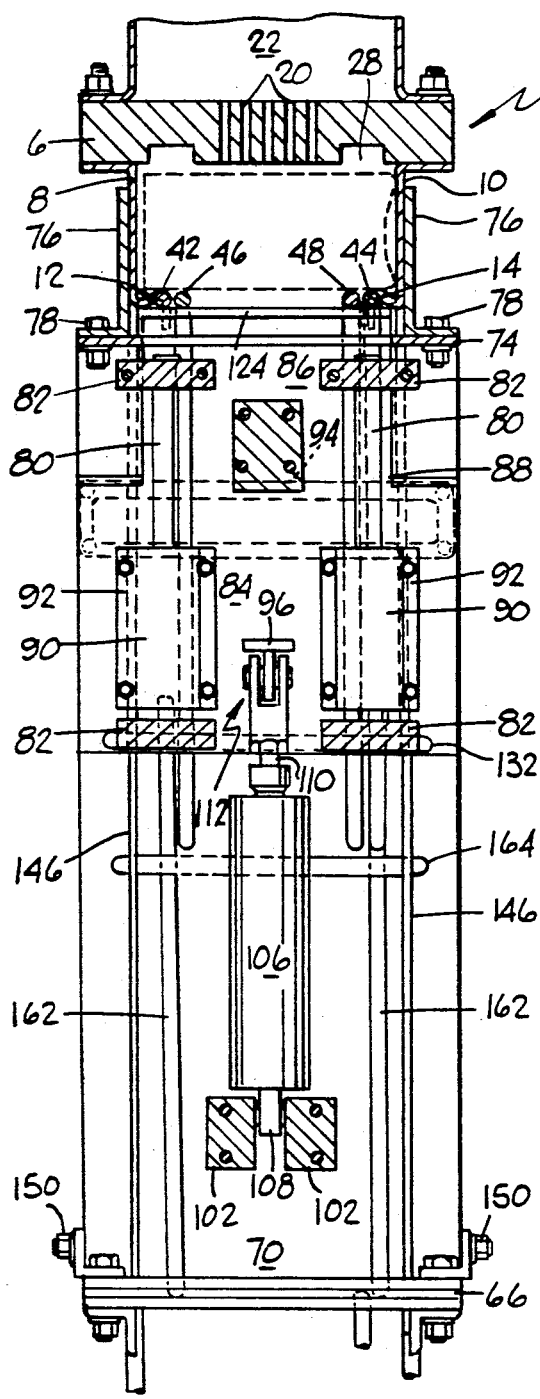
FIG. 2 is a cross-sectional view taken along the line 2—2 of FIG. 1.
Figure 4:
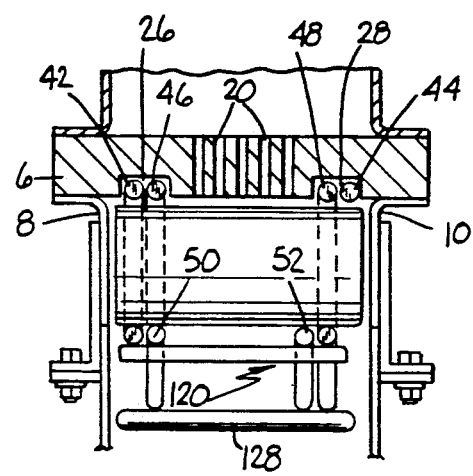
FIG. 4 is a cross-sectional view taken on the line 4—4 of FIG. 3.
Figure 5:
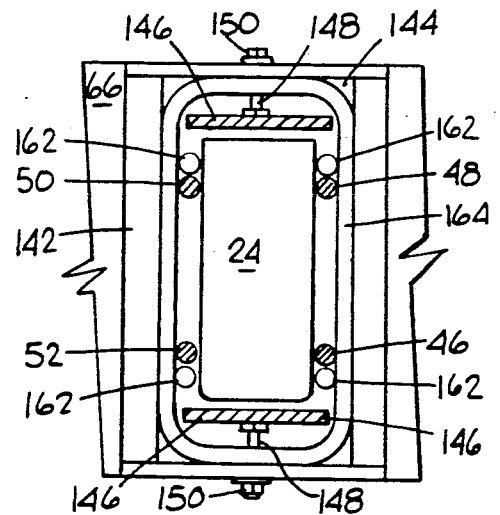
FIG. 5 is a cross-sectional view taken on the line 5—5 of FIG. 3.

A preferred embodiment of the apparatus 2 of this invention is illustrated in the drawings and comprises an air track 4, FIG. 2, having a top wall portion 6, a pair of opposite sidewall portions 8 and 10 with the lower portion thereof being bent to form a bottom wall portion comprising a pair of spaced apart track means 12 and 14. The track means 12 and 14 are cut away between the locations 16 and 18 for purposes described below. A plurality of inclined passageways 20, only a few of which are illustrated, extend through the top wall portion 6 so that air under pressure in a plenum 22 will flow through the passageways 20 and exert a force on the cylindrical bodies 24 to move them through the air track 4 over the track means 12 and 14. A pair of spaced apart, linearly extending recesses 26 and 28 are formed in the top wall portion 6 at a location vertically opposite to the portion of the air track 4 where the track means 12 and 14 were cut away for purposes described below.

Figure 1:
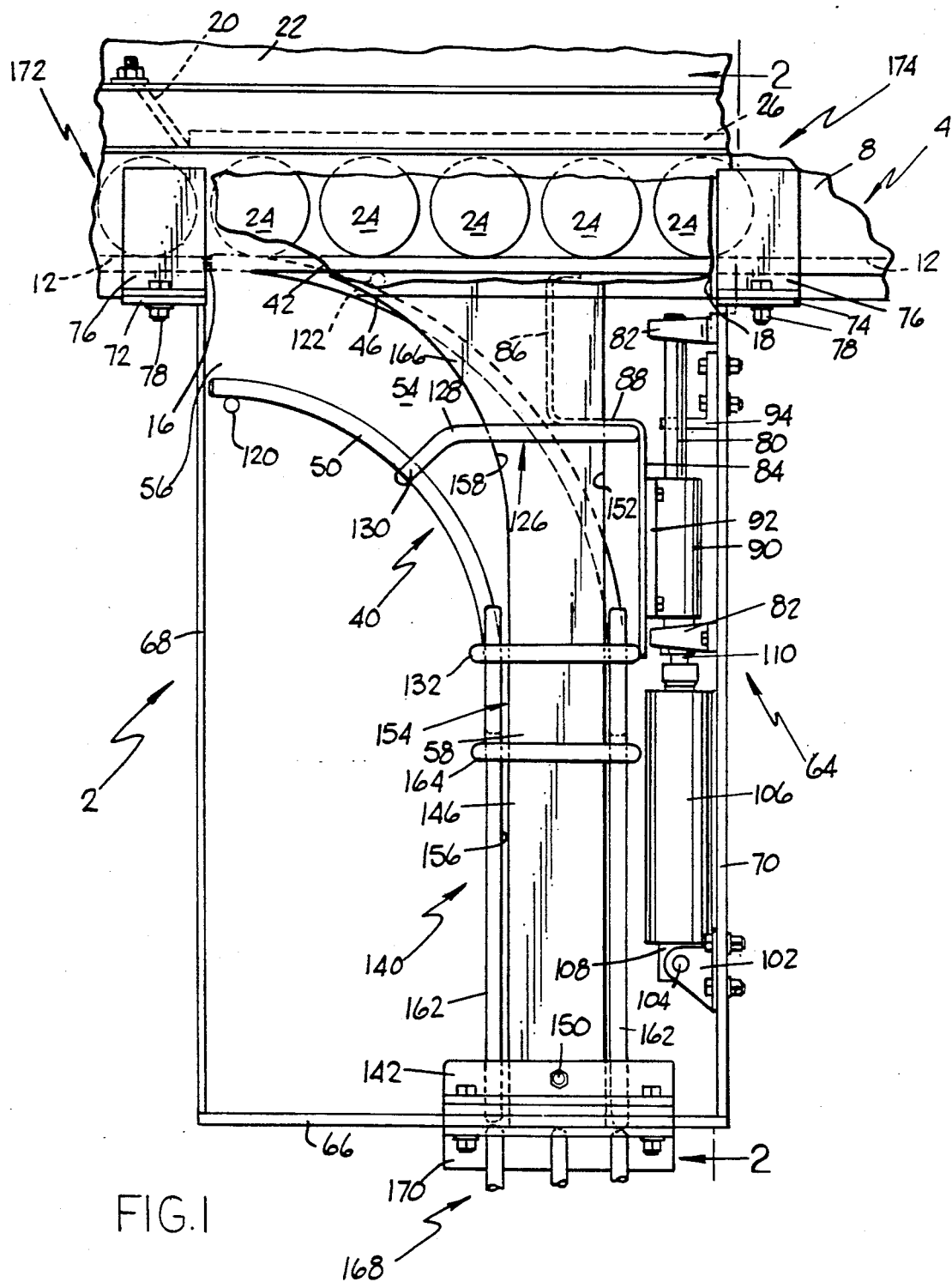
FIG. 1 is a front elevational view illustrating a preferred embodiment of the invention at a first location.
Figure 3:
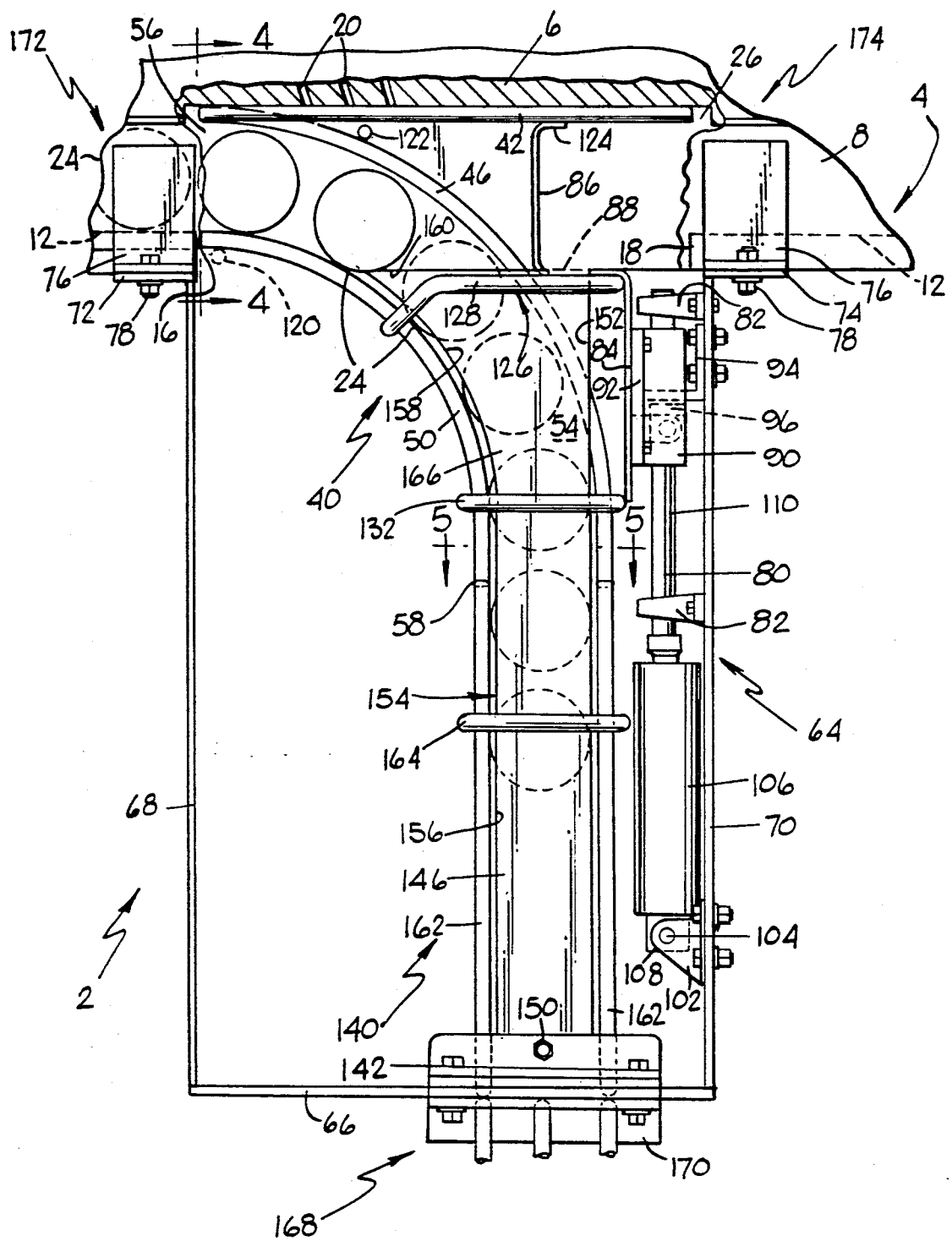
FIG. 3 is a front elevational view illustrating the embodiment of FIG. 1 at a second location.

A diversion gate 40 is mounted for vertical reciprocal movement, by apparatus described below, between a first location illustrated in FIG. 1 and a second location illustrated in FIG. 3. In the first location, a generally horizontal support section of the diversion gate 40 comprises a pair of generally horizontal spaced apart rods 42 and 44 which are located to replace the cut away portions of the track means 12 and 14 so as to support the cylindrical bodies 24 for continued movement in the generally horizontal path. In the second location, the diversion gate 40 has been moved vertically and the generally horizontal, spaced apart rods 42 and 44 are located within the recesses 26 and 28. When in the second location, an arcuate guide section of the diversion gate comprises a first pair of arcuate, spaced apart rods 46 and 48 and a second pair of arcuate, spaced apart rods 50 and 52 located a distance from the first pair of arcuate, spaced apart rods 46 and 48 to form an arcuate passageway 54 for guided movement of the cylindrical bodies 24 for guide movement to another path. The arcuate passageway 54 has an entrance portion 56 which is also located in the recesses 26 and 28 when in the second location and an exit portion 58.

Moving means are provided for moving the diversion gate 40 between the first and second locations. A support member 64 is provided and has bottom wall 66 and two opposite sidewalls 68 and 70. Flange portions 72 and 74 project outwardly from the sidewalls 68 and 70 and are secured thereto by suitable means such as by welding. A plurality of support brackets 76 are secured to the sidewall portions 8 and 10 by suitable means, such as by welding. The support member 64 is mounted to the support brackets 76 by suitable means such as the nuts and bolts 78. A pair of spaced apart shafts 80 are mounted on the sidewall 70 at fixed locations by mounting brackets 82. Support means are provided for supporting the diversion gate 40 and comprise first and second vertical wall portions 84 and 86 joined by an integral horizontal wall portion 88. A pair of spaced apart bushings 90 are mounted at fixed locations on the vertical wall portion 84 by mounting plates 92. The bushings 90 are mounted for reciprocal sliding movement over the shafts 80. A first stop member 94 is mounted on the sidewall 70 at a fixed location and a second stop member 96 is mounted on the vertical wall portion 84 at a fixed location. The first and second stop members 94 and 96 cooperate to limit the movement of the vertical wall portion 84 in the vertical direction.

A pair of spaced apart brackets 102 are mounted on the sidewall 70 at fixed locations and have a pin 104 extending between and secured thereto. An air cylinder 106 has a downwardly projecting portion 108 rotatably mounted on the pin 104. A piston rod 110 extends upwardly from the air cylinder 106 and is rotatably mounted on a portion of the second stop member 96 by the clevis structure 112 FIG. 2. Conventional means (not shown) are connected to the air cylinder 106 to reciprocate the piston rod 110.

Holding means are provided for holding the generally horizontal rods 42 and 44 and the first and second pairs of arcuate, spaced apart rods 46, 48, 50 and 52 in a fixed relationship. A rod 120 extends between and is secured to the second pair of arcuate, spaced apart rods 50 and 52 by suitable means, such as by welding. Another rod 122 extends between the generally horizontal, spaced apart rods 42 and 44 and is secured to the generally horizontal, spaced apart rods 42 and 44 and the first pair of arcuate, spaced apart rods 46 and 48 by suitable means, such as by welding. The vertical wall portion 86 has a flange portion 124 and the generally horizontal, spaced apart rods 42 and 44 are secured thereto by suitable means, such as by welding. A generally rectangular shaped member 126, which may be formed from one rod that is bent into shape or by a plurality of rods secured together by suitable means, such as by welding, extends around the outside portions of the first and second pairs of arcuate, spaced apart rods 46, 48, 50 and 52 and is secured to them by suitable means, such as by welding. The generally rectangularly shaped member 126 has a generally horizontal portion 128 and a downwardly inclined portion 130. Portions of the horizontal portion 128 are secured to the horizontal wall portion 88 or the vertical wall portion 84 by suitable means, such as by welding, for movement therewith. Another generally rectangularly shaped member 132, formed in the same manner as the generally rectangularly shaped member 126, extends around the outside portions of the first and second pairs of arcuate, spaced apart rods 46, 48, 50 and 52 and is secured to them by suitable means, such as by welding. A portion of the generally rectangularly shaped member 132 is secured to the vertical wall portion 84 by suitable means, such as by welding, for movement therewith.

Guide track means 140 for guiding the movement of the cylindrical bodies 24 after they pass through the exit portion 58 are mounted on the bottom wall 66 by mounting bracket 142 which surrounds an opening 144 in the bottom wall 66. A pair of opposite vertically extending sidewalls 146 are mounted on the mounting bracket 142 by suitable means such as the thread bolts 148 and nut 150. Each of sidewalls 146 has a edge portion 152 which extends in a linear direction and an edge portion 154 which has a linearly extending portion 156 and an arcuate portion 158. The top edges 160 FIG. 3 of the sidewalls 146 are secured to the sidewalls 8 and 10 at the cut away portion of the track means 12 and 14 by suitable means, such as by welding. A plurality of vertically extending guide rods 162 are fixedly mounted on the mounting bracket 142. A generally rectangularly shaped member 164, formed in the same manner as the generally rectangularly shaped members 126 and 132, extends around the outside portions of the guide rods 162 and the sidewalls 146 and is secured to the guide rods 162 by suitable means, such as by welding. The arcuate portion 166 of each of the sidewalls 146 is located inside of the generally rectangularly shaped member 126. Additional guide track means 168 are mounted on the other side of the bottom wall 66 by a mounting bracket 170 for guiding the cylindrical bodies 24 to a desired location.

In operation with the diversion gate 40 in the first location, cylindrical bodies 24 will move from a first processing station (not shown) over a first portion 172 of the air track 4, over the generally horizontal, spaced apart rods 42 and 44 and over a second portion 174 of the air track to a second processing station (not shown). When it is desired to move the cylindrical bodies 24 to a third processing station (not shown), the flow of the cylindrical bodies 24 is halted by suitable means (not shown) and the air cylinder 106 is actuated to move the diversion gate from the first location to the second location. The cylindrical bodies 24 leaving the first portion 172 of the air track 4 will move into contact with the first set of arcuate, spaced apart rods 46 and 48 and will be guided for movement through the arcuate passageway 54. When the cylindrical bodies pass through the exit portion 58, they will enter the guide track means 140 and then the guide track means 168 to be guided to the third processing station (not shown).

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A conveying apparatus for use in moving cylindrical bodies from one location to other locations comprising:

an air conveyor for moving cylindrical bodies in a generally horizontal path;
   said air conveyor having a top wall portion through which air is directed onto said cylindrical bodies, a pair of opposite sidewall portions for guiding said cylindrical bodies and a generally horizontal open bottom wall portion formed by a pair of spaced apart track means for supporting said cylindrical containers during said movement thereof;
   a portion of said pair of spaced apart track means forming said bottom wall portion being cut away to form an opening therein through which said cylindrical bodies can pass;
   a diversion gate mounted for reciprocal movement in generally vertical directions between a first location and a second location;
   said diversion gate, when in said first location, having a generally horizontal support section located in said cut away portion for cooperating with said spaced apart track means in supporting said cylindrical bodies during said movement in said generally horizontal path;
   said diversion gate, when in said second location, having an arcuate guide section for contacting said cylindrical bodies and diverting said cylindrical bodies out of said generally horizontal path and into another path;
   moving means for moving said diversion gate between said first and second locations; and wherein said generally horizontal support section comprises a pair of generally horizontal, spaced apart rods; and
   said arcuate guide section comprises a first pair of arcuate, spaced apart rods and a second pair of arcuate, spaced apart rods located a distance from said first pair of arcuate, spaced apart rods to form an arcuate passageway for said cylindrical bodies, said arcuate passageway having an entrance portion and an exit portion.

2. The invention as in claim 1 and further comprising:
   a pair of fixedly mounted opposite sidewalls for guiding the movement of said cylindrical bodies through at least a portion of said arcuate passageway.

3. The invention as in claim 1 and further comprising:
   a pair of spaced apart linearly extending recesses formed in said top wall portion opposite to said cut away portion; and
   said recesses having a depth sufficient to receive all of said pair of generally horizontal, spaced apart rods and said entrance portion of said first pair of arcuate, spaced apart rods when said diversion gate is in said second location.

4. The invention as in claim 1 and further comprising:
   holding means for holding said pair of generally horizontal, spaced apart rods and said first and second pairs of arcuate spaced apart rods in a fixed relationship.

5. The invention as in claim 5 and further comprising:
   a support member mounted at a fixed location;
   support means for supporting said holding means and having at least portions of said holding means secured thereto for movement therewith;
   mounting means for mounting said support means on said support member for reciprocal movement to move said diversion gate between said first and second locations; and
   said moving means being connected to said support means and to said support member.

6. The invention as in claim 5 wherein:
   said support member is mounted at spaced apart locations on said sidewall portions of said air conveyor.

7. The invention as in claim 5 wherein said mounting means comprises:
   a pair of spaced apart shafts fixedly mounted on said support member;
   a pair of spaced apart bushings fixedly mounted on said support means; and
   said pair of spaced apart bushings being mounted for reciprocal movement over said pair of spaced apart shafts.

8. The invention as in claim 7 and further comprising:
   a first stop member mounted at a fixed location on said support member;
   a second stop member mounted at a fixed location on said support means; and
   said first and second stop members cooperating to limit said movement of said support means in a vertical direction.

9. The invention as in claim 5 and further comprising:
   a pair of opposite sidewalls fixedly mounted on said support member;
   portions of said opposite sidewalls guiding the movement of said cylindrical bodies through said arcuate passageway.

10. The invention as in claim 9 wherein:
    at least a portion of said holding means surrounding at least a portion of said sidewalls.

11. The invention as in claim 10 and further comprising:
   guide track means mounted on said support member and cooperating with said portions of said opposite sidewalls for receiving cylindrical bodies from said exit portion and guiding said cylindrical bodies to additional guide track means leading to one of said other processing operations.

12. The invention as in claim 11 and further comprising:
   a pair of spaced apart linearly extending recesses formed in said top wall portion opposite to said cut away portion; and
   said recesses having a depth sufficient to receive all of said pair of generally horizontal, spaced apart rods and said entrance portion of said first pair of arcuate, spaced apart rods when said diversion gate is in said second location.

13. The invention as in claim 12 wherein said mounting means comprises:
   a pair of spaced apart shafts fixedly mounted on said support member;
   a pair of spaced apart bushings fixedly mounted on said support means; and
   said pair of spaced apart bushings being mounted for reciprocal movement over said pair of spaced apart shafts.

14. The invention as in claim 13 and further comprising:
   a first stop member mounted at a fixed location on said support member;
   a second stop member mounted at a fixed location on said support means;
   said first and second stop members cooperating to limit said movement of said support means in a vertical direction; and
   said moving means comprises an air cylinder.

* * * * *